United States Patent
Stanford

(10) Patent No.: US 10,371,179 B2
(45) Date of Patent: Aug. 6, 2019

(54) HYDRAULIC RAM WITH A SIDE LOAD SENSOR

(71) Applicant: Actuant Corporation, Menomonee Falls, WI (US)

(72) Inventor: Frantz D. Stanford, Monona, WI (US)

(73) Assignee: Actuant Corporation, Menomonee Falls, WI (US)

( * ) Notice: Subject to any disclaimer, the term of this patent is extended or adjusted under 35 U.S.C. 154(b) by 0 days.

(21) Appl. No.: 15/124,780

(22) PCT Filed: Mar. 12, 2015

(86) PCT No.: PCT/US2015/020200
§ 371 (c)(1),
(2) Date: Sep. 9, 2016

(87) PCT Pub. No.: WO2015/138735
PCT Pub. Date: Sep. 17, 2015

(65) Prior Publication Data
US 2017/0184137 A1    Jun. 29, 2017

Related U.S. Application Data

(60) Provisional application No. 61/952,080, filed on Mar. 12, 2014.

(51) Int. Cl.
*G01L 1/14* (2006.01)
*G01L 1/16* (2006.01)
(Continued)

(52) U.S. Cl.
CPC ............ *F15B 15/14* (2013.01); *F15B 15/02* (2013.01); *F15B 15/1433* (2013.01);
(Continued)

(58) Field of Classification Search
CPC .......... F15B 15/14; F15B 15/02; F15B 20/00; F15B 15/1433; F15B 2211/7053; G01L 1/14; G01L 1/16
(Continued)

(56) References Cited

U.S. PATENT DOCUMENTS

2012/0011946 A1* 1/2012 Eriksen ................ B64C 25/001
73/866.5

FOREIGN PATENT DOCUMENTS

| DE | 4218949 | 12/1993 |
| DE | 102006028294 | 12/2007 |

(Continued)

OTHER PUBLICATIONS

International Search Report and Written Opinion for Application No. PCT/US2015/020200 dated Jul. 17, 2015 (12 pages).

*Primary Examiner* — Lisa M Caputo
*Assistant Examiner* — Rose M Miller
(74) *Attorney, Agent, or Firm* — Michael Best & Friedrich LLP

(57) ABSTRACT

A hydraulic cylinder assembly, a sensor assembly for a cylinder assembly and methods of assembling and operating a cylinder assembly. The cylinder assembly may include a housing; a ram slidably mounted in the housing; and a sensor assembly mounted between the housing and the ram and operable to sense a side load. The sensor assembly may be incorporated into a bearing. In some constructions, the sensor assembly may include a capacitive sensor. In some constructions, the sensor assembly may include a piezoelectric sensor.

12 Claims, 9 Drawing Sheets

DETAIL C

(51) Int. Cl.
  *F15B 15/14* (2006.01)
  *F15B 15/02* (2006.01)
  *F15B 20/00* (2006.01)
(52) U.S. Cl.
  CPC ............... *F15B 20/00* (2013.01); *G01L 1/14* (2013.01); *G01L 1/16* (2013.01); *F15B 2211/7053* (2013.01)
(58) Field of Classification Search
  USPC .................. 73/593, 767, 768, 778, 779, 780
  See application file for complete search history.

(56) References Cited

FOREIGN PATENT DOCUMENTS

| | | |
|---|---|---|
| DE | 102008016790 | 10/2009 |
| EP | 2508859 | 10/2012 |
| WO | 02088653 | 11/2002 |
| WO | 2013152807 | 10/2013 |

\* cited by examiner

FIG. 2 SECTION B-B

DETAIL C

HYDRAULIC RAM WITH A SIDE LOAD SENSOR

FIELD

The present invention generally relates to hydraulic cylinders and methods of assembling and operating the same.

SUMMARY

Current hydraulic cylinders may be subject to seizing if side loads are applied to the cylinder. This results primarily from the hydraulic ram binding with the housing, where steel and steel slide relative one to the other. When comparable materials slide relative to each other, material can be exchanged between them, resulting in binding, damage (e.g., gouging), failure, etc.

In order to reduce problems associated with this metal-on-metal sliding, a bearing with a lubricous material, such as a hard composite or bronze, may be placed in the housing, so that the lubricous material can slide on the ram. However, a side load can still occur, and it is difficult to determine whether excess side loads are being or have been applied to the hydraulic cylinder.

In one independent embodiment, a hydraulic cylinder may generally include a housing; a ram slidably mounted in the housing; and a sensor assembly mounted between the housing and the ram and operable to sense a side load. The sensor assembly may be incorporated into a bearing. In some constructions, the sensor assembly may include a capacitive sensor. In some constructions, the sensor assembly may include a piezoelectric sensor.

In another independent embodiment, an assembly for a hydraulic cylinder assembly may be provided. The cylinder assembly may include a housing and a ram slidably mounted in the housing. The assembly may generally include an inner wear plate having a surface engageable with an outer surface of the ram; and a sensor assembly mounted between the inner wear plate and the housing and operable to sense a side load.

In yet another independent embodiment, a method of assembling a hydraulic cylinder assembly may be provided. The method may generally include supporting a sensor assembly between the housing and the ram, the sensor assembly being operable to sense a side load.

In a further independent embodiment, a method of operating a hydraulic cylinder assembly may be provided. The method may generally include sensing a side load with the sensor assembly.

Independent aspects of the invention will become apparent by consideration of the detailed description, claims and accompanying drawings.

DETAILED DESCRIPTION

Figure 1:
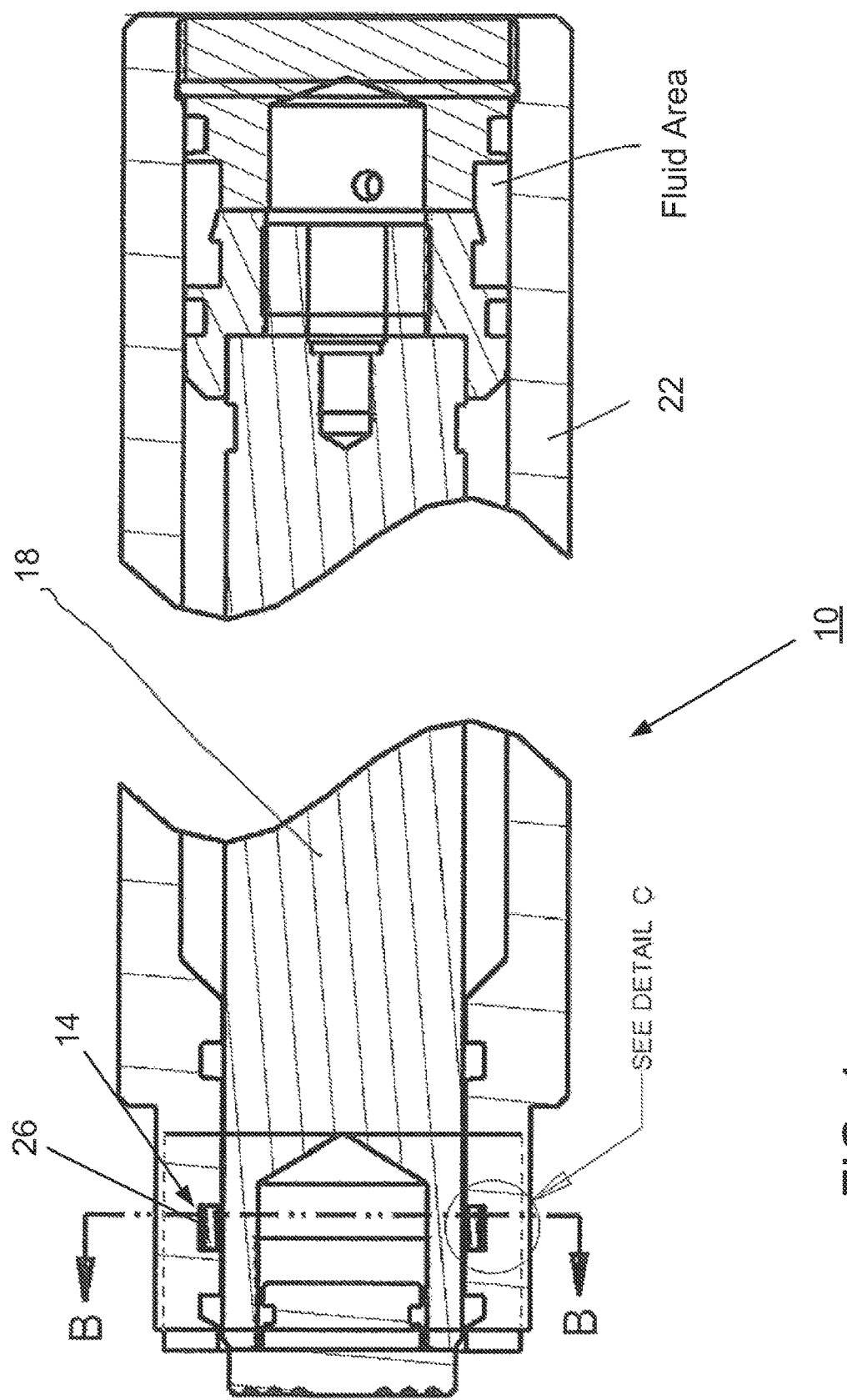
FIG. 1 is a cross-sectional view of a hydraulic cylinder assembly including a sensor assembly.
Figure 2:
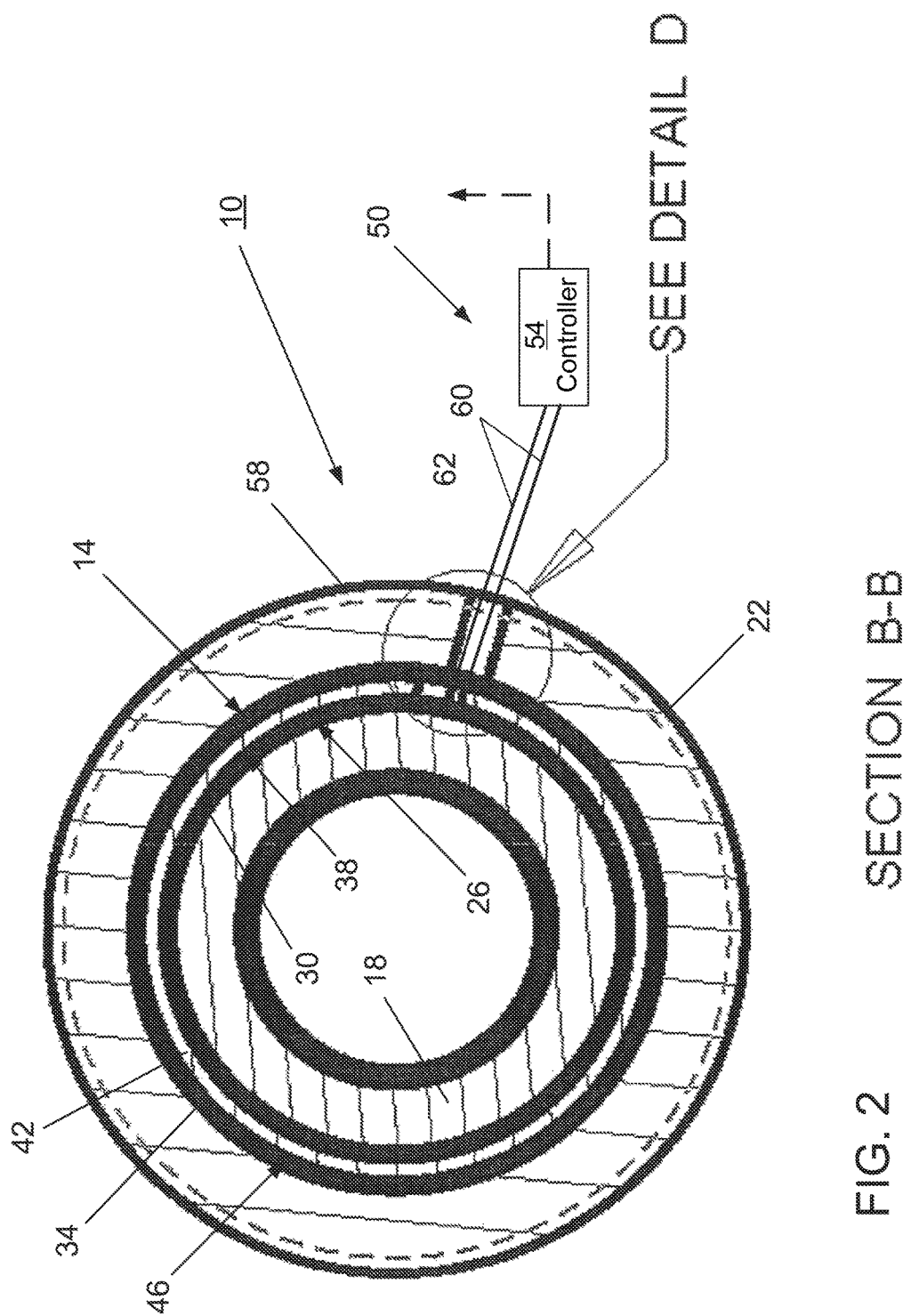
FIG. 2 is a cross-sectional view of a portion of the cylinder assembly taken generally along line B-B in FIG. 1.
Figure 3:
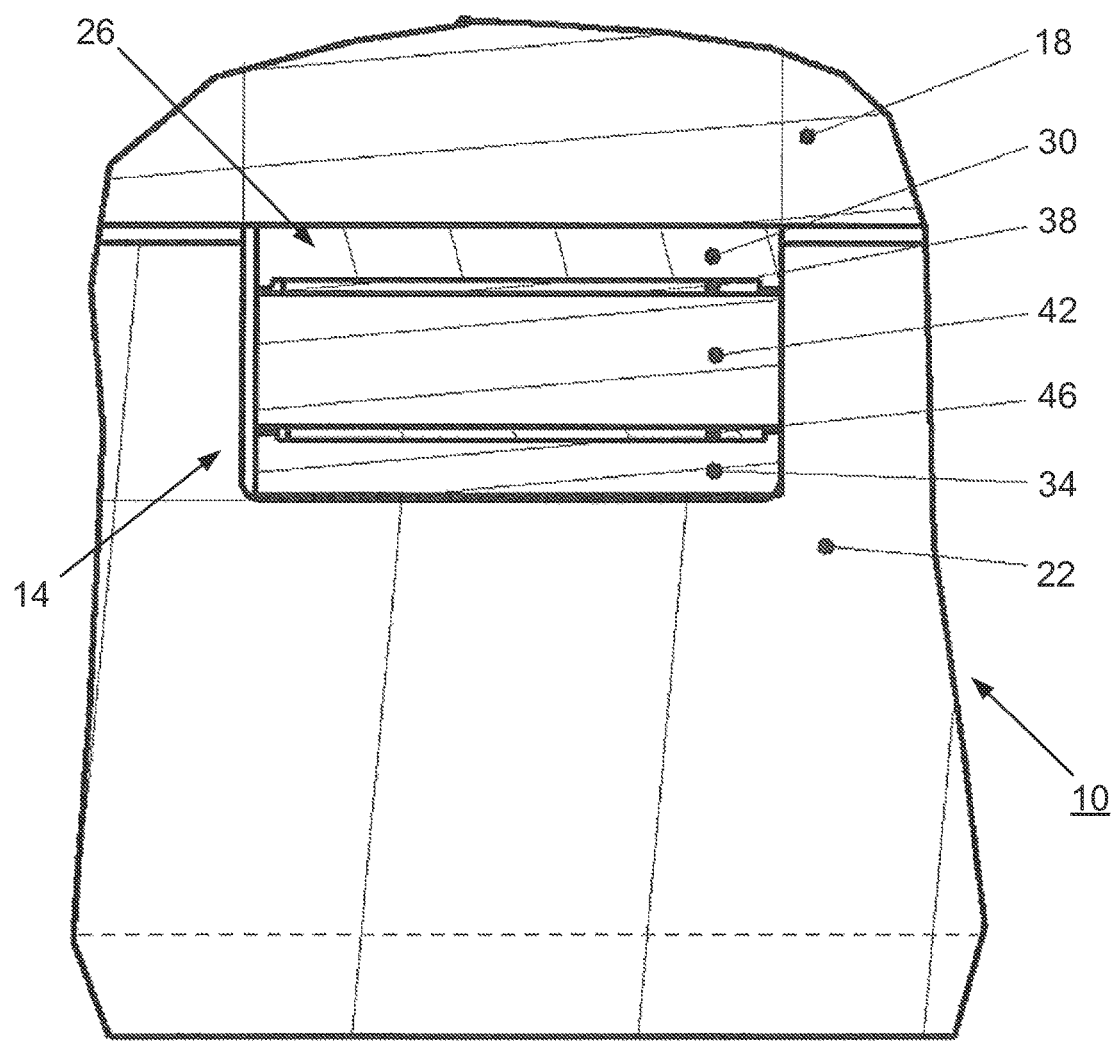
FIG. 3 is an enlarged cross-sectional view of a portion of the cylinder assembly in Detail C in FIG. 1.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

FIGS. 1-9 illustrate constructions of a hydraulic cylinder assembly 10 including a sensor assembly 14 operable to sense a side load. The cylinder assembly 10 includes a housing 22 slidably supporting the ram 18, and the sensor assembly 14 is mounted between the housing 22 and the ram 18.

A bearing 26 is mounted between the ram 18 and the housing 22 and includes an inner wear plate 30 engageable with an outer surface of the ram 18 and an outer wear plate 34 engaging the inner surface of the housing 22. The wear plates 30, 34 are formed of suitable materials such as, for example, Teflon®, a Teflon® composite, etc.

In the illustrated constructions, the sensor assembly 14 is incorporated into the bearing 26. It should be understood that, in other constructions (not shown), the sensor assembly 14 may be separate from the bearing 26 and/or incorporated into another portion of the cylinder assembly 10.

In the constructions shown in FIGS. 1-4 and 7, the sensor assembly 14 includes a capacitive sensor including an inner conductive plate 38, a middle plate 42, serving as a dielectric, and an outer conductive plate 46. The conductive plates 38, 46 are formed of a suitable conductive material, such as, for example, copper. The inner wear plate 30 is between the ram 18 and the inner conductive plate 38, and the outer wear plate 34 is between the outer conductive plate 46 and the housing 22. In the illustrated construction, the inner wear plate 30, the inner conductive plate 38, the middle plate 42, the outer conductive plate 46, the outer wear plate 34 are annular.

The conductive plates 38, 46 are connected in a circuit 50 including a processing unit or a controller 54 operable to receive a signal from the sensor assembly 14 and to evaluate or determine a side load. When a side load is present on the cylinder assembly 10, the spacing between the conductive plates 38, 46 changes, changing the capacitance of the sensor assembly 14. By measuring the capacitance or change in capacitance, a side load on the cylinder assembly 10 can be determined.

It should be understood that electronic components (e.g., the controller 54), associated modules and logical structures are capable of being implemented in software executed by a microprocessor or a similar device and/or of being implemented in hardware using a variety of components including, for example, application specific integrated circuits ("ASICs"). Terms like "controller" and "module" may include or refer to both hardware and/or software stored in a non-transitory, computer-readable medium.

It should also be noted that a plurality of hardware and software based devices, as well as a plurality of different structural components may be used to implement such components. In addition, it should be understood that one or more embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, electronic-based aspects may be implemented in software (e.g., stored on non-transitory computer-readable medium) executable by one or more processing units. As such, it should be noted that a plurality of hardware and software-based devices, as well as a plurality of different structural components may be utilized to implement such components. Furthermore, the specific mechanical configurations illustrated in the drawings are intended to exemplify independent embodiments and that other alternative configurations are possible. For example, "electronic devices," "computers," "computing devices," "controllers," "control devices," or "control modules", as may be described in the present specification, can include one or more processing units, one or more computer-readable medium modules, one or more input/output interfaces, and various connections (e.g., a system bus) connecting the components.

Figure 4:
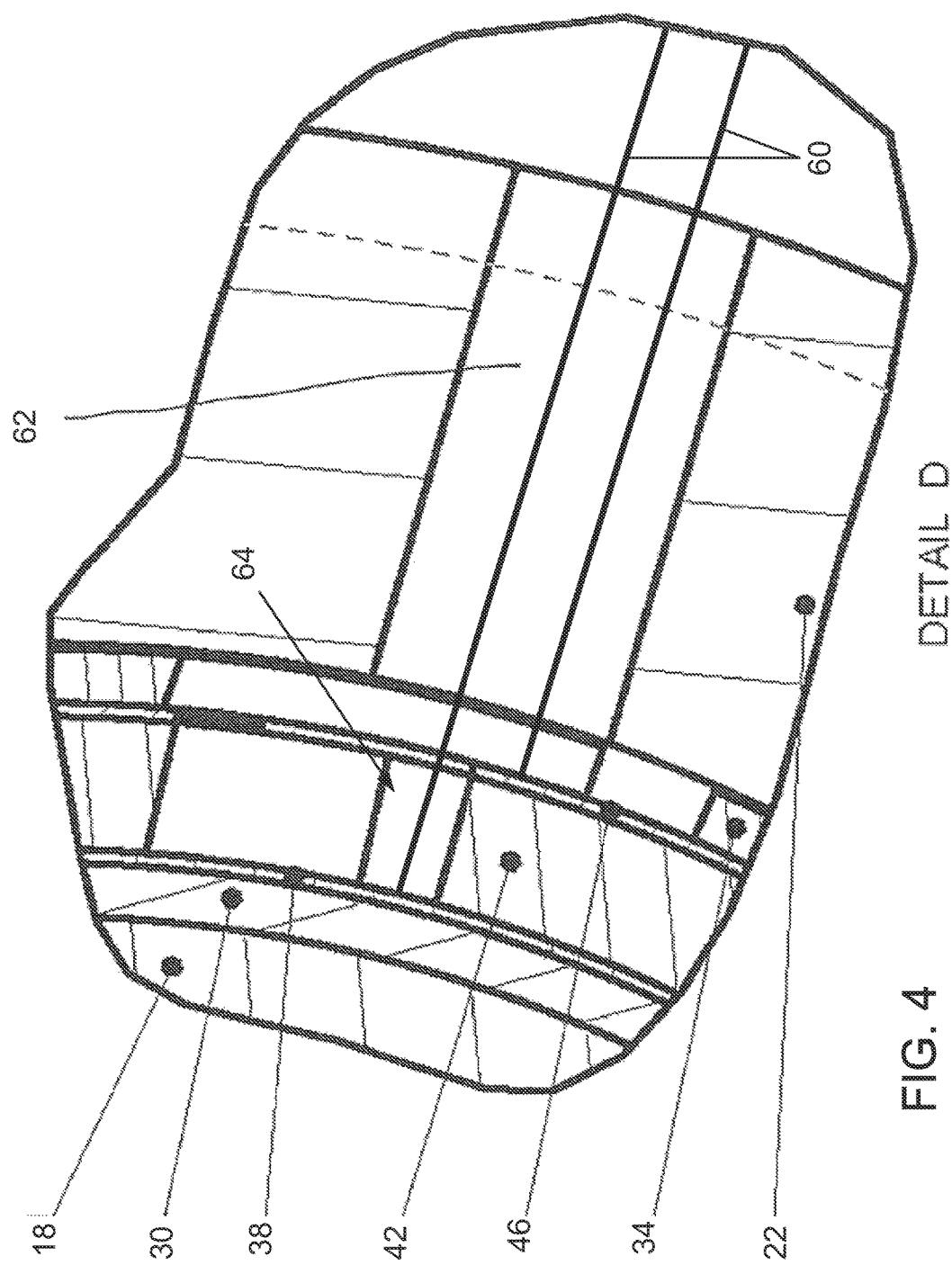
FIG. 4 is an enlarged cross-sectional view of a portion of the cylinder assembly in Detail D in FIG. 2.
Figure 5:
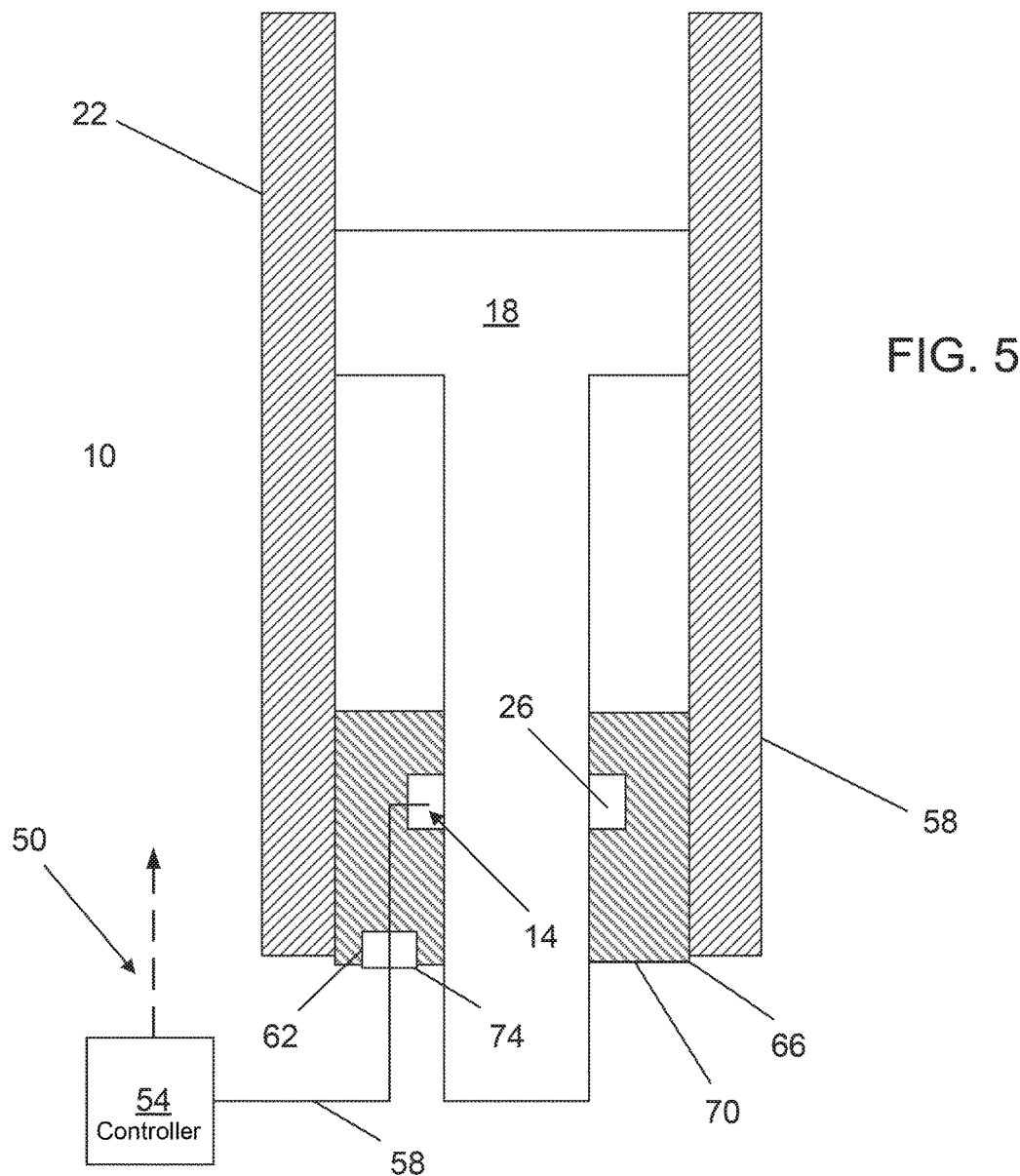
FIG. 5 is a schematic view of an alternative construction of a cylinder assembly.
Figure 6:
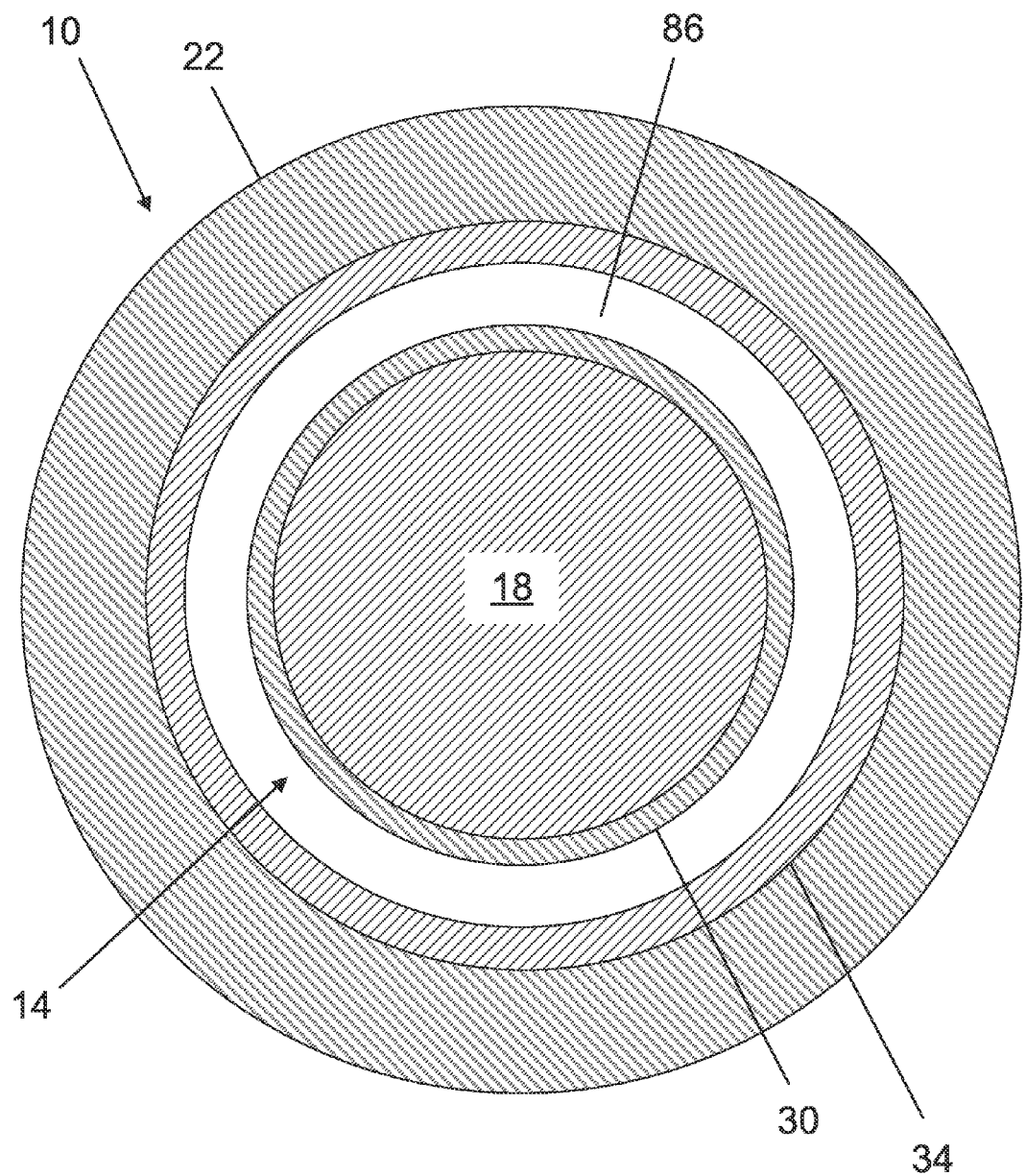
FIG. 6 is a schematic view illustrating an alternative construction of a sensor assembly.
Figure 7:
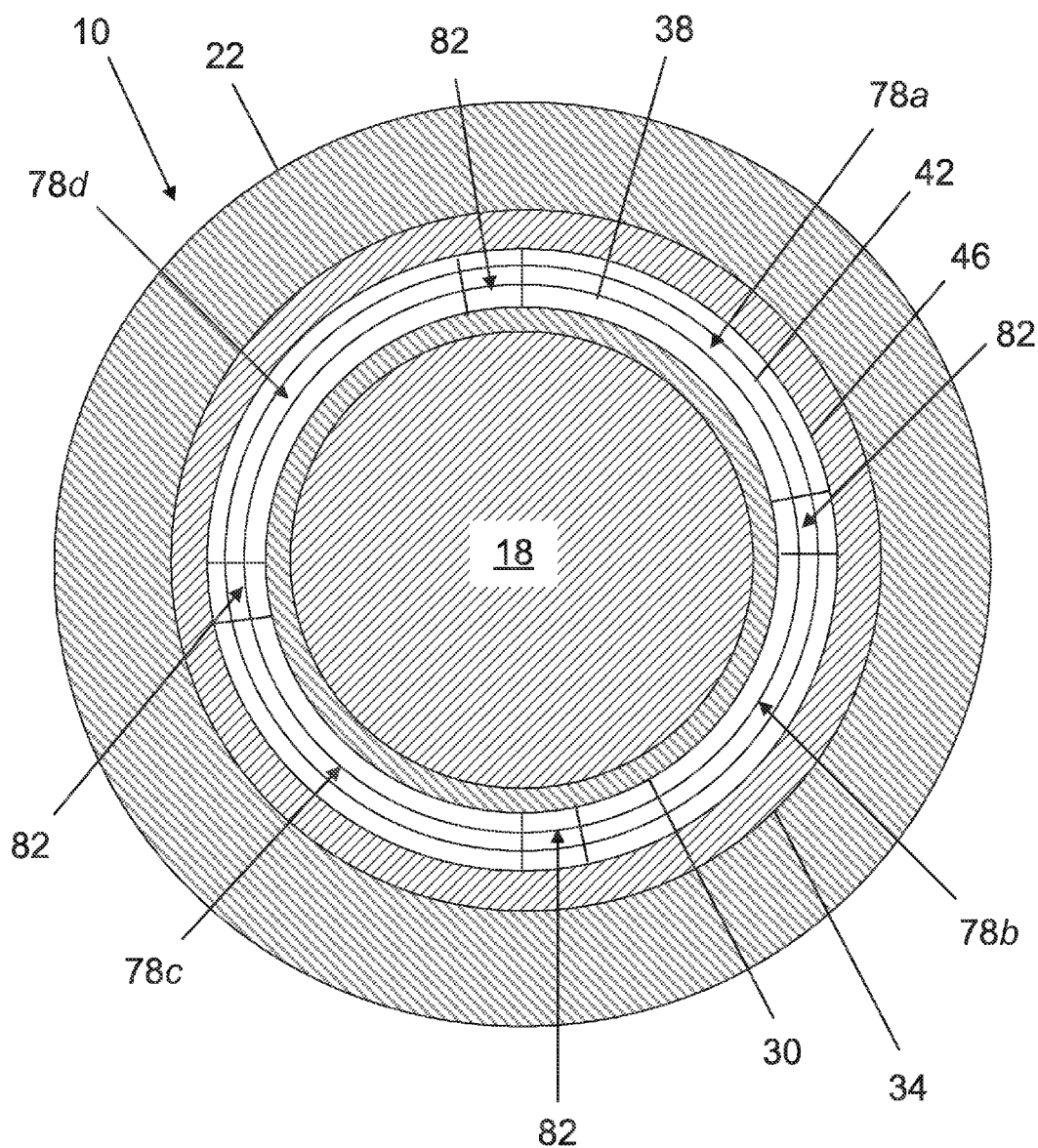
FIGS. 7-8 are schematic views illustrating alternative constructions of the sensor assembly.
Figure 8:
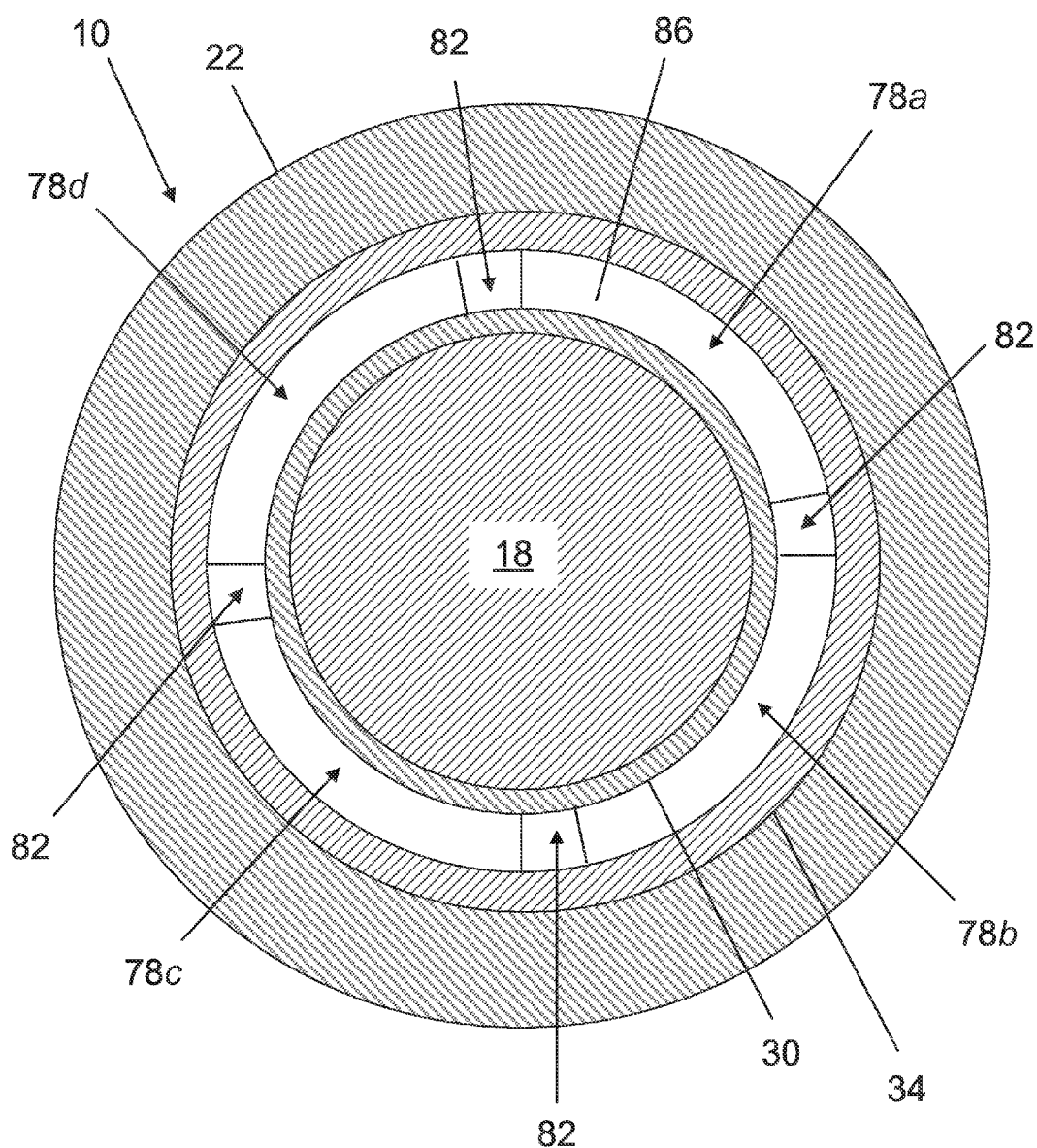

As shown in FIG. 4, the side wall 58 of the housing 22 defines a radial opening 62, and, in the illustrated construction, the middle plate 42 defines an opening 64 communicating with the opening 62. The circuit 50 includes wires 60 electrically connected to the conductive plates 38, 46 and extending through the opening 62 (and, for the wire 60 connected to the inner conductive plate 38, through the opening 64) to an exterior of the housing 22. In an alternative construction (see FIG. 5), the end wall 66 of the housing 22 defines the opening 62 (as an axial opening).

In some constructions (see FIG. 5), a stop ring 70 provides the end wall 66 with the opening 62 and supports the ram 18 and the bearing 26 (including the sensor assembly 14). In the illustrated construction, the stop ring 70 is removably connected to the side wall 58 (e.g., by threads). The stop ring 70, the bearing 26 and/or the sensor assembly 14 may be replaceable in the cylinder assembly 10 and/or may be retrofitted to a cylinder assembly (not shown) which does not include a sensor assembly.

If the cylinder assembly 10 is a single-acting cylinder (as shown in FIG. 4), the opening 62 communicates between the interior of the housing 22 and atmosphere. With a double-acting cylinder assembly 10 (see FIG. 5), a plug 74 seals the opening 62 to seal the interior of the housing 22.

In an alternative construction (see FIGS. 6 and 8), the sensor assembly 14 includes a piezoelectric sensor with a piezoelectric plate 86 between the inner wear plate 30 and the outer wear plate 34. The piezoelectric plate 86 is operable to measure a force difference to sense a side load and to communicate with the controller 54. In the illustrated construction, the inner wear plate 30, the piezoelectric plate 86, and the outer wear plate 34 are annular.

In another construction (see FIGS. 7-8), the sensor assembly 14 includes a plurality of sensor sections 78a, 78b, 78c . . . 78n spaced about the circumference of the ram 18. Each sensor section 78 extends about a portion of the circumference of the ram 18, and adjacent sensor sections 78 are separated by a non-conductive section 82 (e.g., a non-conductive material, an insulating material, an air gap, etc.).

Each sensor section 78 is operable to sense a side load on the associated portion of the circumference of the ram 18 and to communicate with a controller 54. In such constructions, a single controller 54 may communicate with the sensor sections 78a-78n, or multiple controllers 54 may be provided to communicate with one or more of the sensor sections 78a-78n.

In an alternative construction of the capacitive sensor (see FIG. 7), each sensor section 78 includes an inner conductive plate 38 and an outer conductive plate 46 separated by a middle plate 42. In the illustrated construction, a single annular middle plate 42 separates the conductive plates 38, 46 of the sensor sections 78. However, in other constructions (not shown), a separate middle plate 42 may be provided in each sensor section 78 to separate the conductive plates 38, 46 of the sensor section 78. In the capacitive sensor, the non-conductive section 82 is at least between circumferentially-adjacent conductive plates 38, 46.

In an alternative construction of the piezoelectric sensor assembly (see FIG. 8), each sensor section 78 includes a separate piezoelectric plate 86, and the non-conductive sections 82 separate circumferentially-adjacent piezoelectric plates 86.

Figure 9:
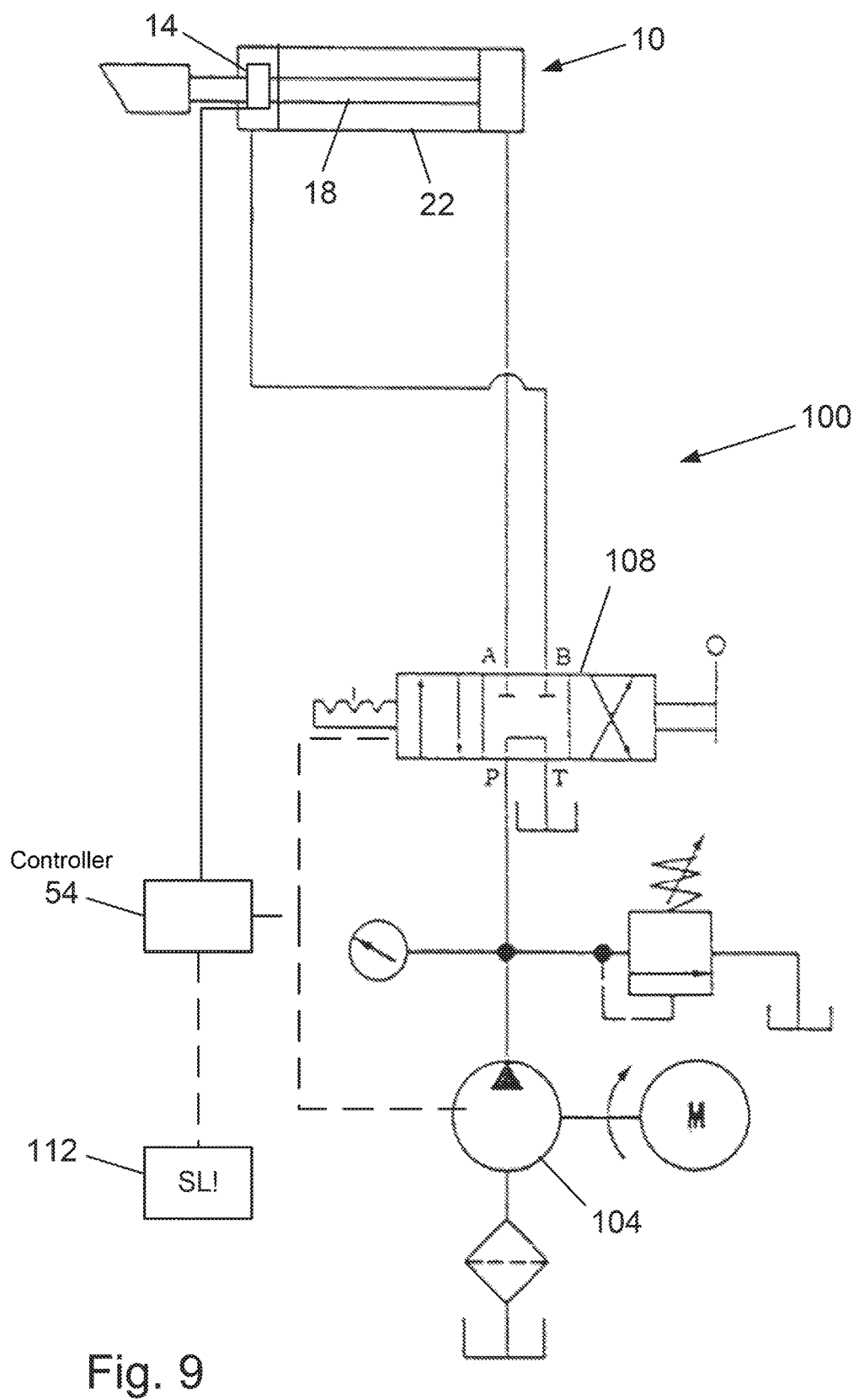
FIG. 9 is a schematic diagram of a hydraulic system including a cylinder assembly.

As shown in FIG. 9, the cylinder assembly 10 is used in a hydraulic system 100 generally including a pump 104 to supply and a valve assembly 108 to control the supply of hydraulic fluid to the cylinder assembly 10 to move (e.g., extend and/or retract) the ram 18 relative to the housing 22. The system 100 also includes a user interface 112 configured to receive inputs from the user (e.g., to operate the system 100) and/or to provide outputs (e.g., visible, audible, tactile, etc.) to the user.

The controller 54 communicates with the system 100. In the event a side load is sensed, the controller 54 is operable to provide an output to the user and/or to control operation of the system 100 (e.g., adjust or stop operation of the pump 104, control the valve assembly 108 to change or stop fluid flow to the cylinder assembly 10, etc.). In some constructions, below a threshold value for a side load, the controller 54 provides an output to the user (e.g., a display on the user interface 112 ("SL!" for side load)) indicating a side load, and the user may take action to control operation of the system 100. At or above the threshold value, the controller 54 operates to control operation of the system 100 (e.g., stop movement of the ram 18 relative to the housing 22). A user can then adjust the orientation, positioning of the cylinder assembly 10 relative to a load and/or a support to reduce or eliminate any side load.

Thus, the invention may provide, among other things, a hydraulic cylinder assembly including a sensor assembly operable to sense a side load in the cylinder assembly. The sensor assembly may include a capacitive sensor, a piezoelectric sensor, etc. The sensor assembly may be used to provide feedback to the user and/or to control operation of the hydraulic system.

One or more independent features and independent advantages of the invention may be set forth in the following claims:

What is claimed is:

1. A hydraulic cylinder assembly comprising:
a housing;
a ram slidably mounted in the housing; and
a sensor assembly mounted between the housing and the ram and operable to sense a side load, the sensor assembly including, a first inner conductive plate extending about a first portion of a circumference of the ram, a first middle plate and a second middle plate, and a first outer conductive plate extending about the first portion of the circumference of the ram, the first inner conductive plate and the first outer conductive plate being separated the first middle plate, the first inner conductive plate and the first outer conductive plate being operable to sense a side load on the first portion of the circumference of the ram, a second inner conductive plate extending about a second portion of a circumference of the ram spaced from the first portion of the circumference, and a second outer conductive plate extending about the second portion of the circumference of the ram, the second inner conductive plate and the second outer conductive plate being separated by the second middle plate, the second inner conductive plate and the second outer conductive plate being operable to sense a side load on the second portion of the circumference of the ram.

2. The cylinder assembly of claim 1, further comprising a bearing mounted in the housing between the ram and the housing, the sensor assembly being incorporated into the bearing.

3. The cylinder assembly of claim 2, wherein the bearing includes an inner wear plate engageable with an outer surface of the ram, the inner wear plate being between the ram and the sensor assembly.

4. The cylinder assembly of claim 3, wherein the bearing further includes an outer wear plate engageable with an inner surface of the housing, the outer wear plate being between the sensor assembly and the housing.

5. The cylinder assembly of claim 1, wherein the first and second middle plates serve as dielectrics.

6. The cylinder assembly of claim 1, wherein the first inner conductive plate, the first middle plate and the first outer conductive plate are annular.

7. The cylinder assembly of claim 1, wherein the housing includes a side wall defining a radial opening, and wherein the cylinder assembly further comprises a circuit electrically connected to the sensor assembly, the circuit including a wire electrically connected to the sensor assembly and extending through the opening to an exterior of the housing.

8. The cylinder assembly of claim 7, wherein the cylinder assembly is a double-acting cylinder assembly, and wherein the housing includes a plug sealing the opening.

9. The cylinder assembly of claim 1, wherein the housing includes an end wall defining an axial opening, and wherein the cylinder assembly further comprises a circuit electrically connected to the sensor assembly, the circuit including a wire electrically connected to the sensor assembly and extending through the opening to an exterior of the housing.

10. The cylinder assembly of claim 9, wherein the cylinder assembly is a double-acting cylinder assembly, and wherein the housing includes a plug sealing the opening.

11. The cylinder assembly of claim 9, wherein the housing includes a side wall and a stop ring providing the end wall, the stop ring being removably connected to the side wall.

12. The cylinder assembly of claim 1, further comprising a circuit electrically connected to the sensor assembly, the circuit including a controller electrically connected to the sensor assembly, the controller being operable to receive a signal from the sensor assembly and to determine a side load.

* * * * *